United States Patent [19]

Ålander et al.

[11] Patent Number: 5,474,639
[45] Date of Patent: Dec. 12, 1995

[54] METHOD FOR MANUFACTURING HEAT EXCHANGERS

[76] Inventors: Johan Ålander, Hagagatan 46, II; Björn Hagert, c/o Ålander, Hagagatan 46, II, both of S-113 47 Stockholm, Sweden

[21] Appl. No.: 256,793
[22] PCT Filed: Feb. 5, 1993
[86] PCT No.: PCT/SE93/00093
 § 371 Date: Jul. 22, 1994
 § 102(e) Date: Jul. 22, 1994
[87] PCT Pub. No.: WO93/16346
 PCT Pub. Date: Aug. 19, 1993

[30] Foreign Application Priority Data

Feb. 6, 1992 [SE] Sweden ................................. 9200342

[51] Int. Cl.⁶ ........................... B32B 31/26; B32B 31/20; F28F 3/00
[52] U.S. Cl. ...................... 156/309.6; 156/196; 165/166
[58] Field of Search .................................. 165/165, 166, 165/167; 156/196, 198, 308.2, 309.6

[56] References Cited

U.S. PATENT DOCUMENTS 4,061,702 12/1977 Kessler ............................. 156/150 X
4,733,718 3/1988 Schikowsky et al. .
4,907,648 3/1990 Emmerich et al. ...................... 165/166

FOREIGN PATENT DOCUMENTS

| 0226825 | 7/1987 | European Pat. Off. . | |
| 0243575 | 11/1987 | European Pat. Off. . | |
| 0243574 | 11/1987 | European Pat. Off. . | |
| 0315052 | 5/1989 | European Pat. Off. . | |
| 2421414 | 12/1974 | Germany | 165/166 |
| 3137296 | 4/1983 | Germany | 165/166 |

*Primary Examiner*—Michael W. Ball
*Assistant Examiner*—David W. Reed
*Attorney, Agent, or Firm*—Young & Thompson

[57] ABSTRACT

A heat exchanger having plastic channel plates (10) is manufactured by stacking the plates with intermediate spacer members. The channel plates comprise two outer walls (12, 14) which are interconnected by a plurality of intermediate walls (16). The end-portions of the intermediate walls are melted along a predetermined length thereof, while the end-portions of the outer walls of each channel plate are caused to bend away from one another, such that the edges will form integrated unities with the edges of adjacent end-portions of adjacent channel plates. Prior to solidification of the resultant joins, the joins may be flattened-out with the aid of a roller. According to the invention, the spaces defined by the outer walls of the channel plates and the spacer members may be filled with plastic particles, which form an integrated unity with the end-portions of the channel plates.

13 Claims, 4 Drawing Sheets

METHOD FOR MANUFACTURING HEAT EXCHANGERS

FIELD OF THE INVENTION

The present invention relates to a method of manufacturing heat exchangers for counter flow, cross flow or parallel flow, wherein the heat exchangers are substansially made up of a plurality of extruded plastic channel plates, and a heat exchanger produced according to the method.

BACKGROUND OF THE INVENTION

One such method is described in EP-A1-0 315 052. According to this known method the channel plates are treated in a manner to cause respective end portions of the outer walls of the individual channel plates of the heat exchanger to bend outwardly, such that the edges of said outwardly bent end portions will lie in contact with one another or in the vicinity of one another, and are then mutually joined by a weld seam, by gluing or by a U-shaped section fitted over said edges, so as to close the channels in the transverse channel system, formed with the aid of spacer members, at the side edges of said channels. The heat exchanger may be coupled for parallel current, counter current or cross current flow of the heat-exchanging fluids, which may be liquids or gases.

According to one preferred alternative proposed in the aforesaid publication, a part of the end portions of the intermediate walls is milled away prior to mutually assembling the channel plates together with intermediate spacer members, so as to expose a desired length of the end portions of the outer walls, these exposed end portions then being bent outwards. According to another alternative proposed in the aforesaid publication, the intermediate walls are configured at the channel-plate manufacturing stage such that the height of the end-portions of said intermediate walls becomes succesively greater the closer to the edge of the channel plates at the same time as the end portions of the outer walls are given a correspondingly, outwardly curved or bent form.

This pre-forming of the channel plates involves additional work and therewith higher manufacturing costs.

Another method of manufacturing a heat exchanger comprising plastic channel plates is described in EP-0-226 825. The end portions of the channel plates are fitted into openings provided in two plastic end plates and are therewith held parallel with one another in given space relationship. The channel plates are then heat treated so as to melt the ends of the narrow long sides and the broad long sides of said plates, causing the channel walls to expand and to fuse to the inner defining surfaces of said openings. Alternatively, the channel plates may extend slightly freely above the openings in the end plate, so as to enable the ends of the channel plates to expand during the heat treatment and thereby lock the channel plates in the end-plate openings. Thus, in order to produce a separate heat exchanger it is necessary to use two end plates provided with openings in which the end portions of the channel plates shall be fitted to desired positions. The end plates together with their accurately disposed and configured openings involve additional costs, as does also the task of fitting the channel plates in the openings provided in said two end walls.

U.S. Pat. No. 4,733,718 and DE-A-2 751 115 describe methods which are even further distant from the inventive concept than EP-A-226 825, and consequently the methods taught by these publications will not be discussed in detail here.

SUMMARY OF THE INVENTION

An object of the present invention is to provide a simpler method of manufacture than the aforedescribed known methods, without the need to pre-form the channel plates or the need to use additional end plates provided with openings into which the ends of the channel plates are inserted and then melt-fused together with the walls defining said openings.

This object is achieved with the inventive method, in which a plurality of extruded plastic channel plates are mutually stacked together with intermediate spacer members so as to form a first channel system between the channel plates and to form a second channel system consisting of channels in the channel plates, said plates having two outer walls which are mutually connected by parallel intermediate walls to form the second channel system, and in which the end-edges of the outer walls forming respective channel walls in the first channel system are mutually joined with the aid of heat treatment so as to close the channels of the first channel system at the side edges of said channels, which method is characterized in that the end sides of the plate pack, in the proximity of the ends of the second channel system, are heated with radiation heat or with thermal convection heat until a predetermined length of the end-portions of the intermediate walls has melted down and that the end-portions of adjacent outer walls at the same time are caused to bend outwardly away from one another as a result of changes, due to the heat treatment, in the stresses present in the plastic material, such that the essentially semi-liquid end-portions are essentially brought into contact with the outwardly curved end-portions of the outer walls of adjacent channel plates and are integated with said outer walls.

The channel plates are extruded in a known manner from a plastic material, preferably polypropylene, although any other material suitable for carrying-out the inventive method and having corresponding properties may be used, while utilizing the stresses induced in the plates during their extrusion. It has also been found that translucent plastic materials are especially suitable for the inventive method in that they have properties that provide better results regarding strength, and also in that they have a facilitating effect regarding production engineering; this is probably due to theese materials crystalline proporties.

The channel plates are then assembled into a pack with intermediate spacer members and, in accordance with the invention, the channel-plate pack is simply moved past an apparatus which delivers radiation heat or thermal convection heat so as to heat the pack at those end surfaces thereof where the channel-ends of the channel plates are located. The end surfaces are heated to an extent sufficient to bring the end-portions of the channel walls to a given molten state and to bring the end-portions of the outer walls to a plastic state and the edges to a molten state. Tests have shown that this is possible. The stresses in the plastic material are evidently changed during the heat treatment, so as to cause the end-portions of the outer walls to bend outwardly from one another at their respective edges and to form an integrated unity with the edges of adjacent end-portions. The joins obtained are both tight and have good strength. The joins may be subjected to pressure during solidification of the partially plasticized material with the aid of a roller, plate or some other appropriate device in a manner to flatten out the joins and to form a smooth end surface.

The spacer members are preferably disposed in the vicinity of the end-portions of the outer walls prior to the heat treatment, and are preferably removed after the operation is concluded. The spacer members can be heat-absorbing members made of heat-absorbing material, such as aluminum, although any material whith similar properties can be used. They can have the form of strips or plates, or any similar shape.

According to one embodiment of the present invention, at least one intermediate space defined by the outer surfaces of the outer walls of two adjacent channel plates and intermediate spacer members, when the spacer member is disposed in the proximity of the end-portions of the outer walls, can be filled either completely or partially with plastic particles prior to the heat treatment. The plastic particle filling is secured by the heat treatment, partly through fusion of the particles with the channel plates. This will further increase the strength of the heat exchanger construction and enable a larger distance between the channel plates. In this embodiment the position of the spacer members are adjusted in relation to the end-portions in such a manner that the plastic particle filling gives joins with sufficient strenght in the heat treatment. The extent and nature of this adjustment will in practise be sufficiently easy to determine for a person skilled in the art.

An other object of the present invention is a heat exchanger produced by the method according to said invention.

DEFINITIONS

By the term "particle" is in this application meant any suitable form such as briquettes, granules, granulates, pellets, grains, beads, tablets and other similar forms that according to a person skilled in the art can be comprised in the idea or concept of a particle. In a preferred embodiment the plastic particles are in form of a powder, and most preferred in form of a fine powder suitable for sufficiently fast and even melting. Preferred particle size is from about 0.05 mm to 3 mm, and especially from about 0.05 mm to 1 mm. The particles are preferably made from a material that according to melting proporties are compatible with the channel plate material. The particulate plastic material may, for instance, be of the kind designated "SC 1355 RM" marketed by Neste Polyeten AB, Stenungsund, Sweden; this particulate polypropylene plastic material has an estimated melting point of about 160° C. and a particle size from about 0.1 mm to about 0.8 mm.

The term "integrated" means in this application a state in which the parts or objects, that are integrated, are joined, united, or adhered to each other through fusion, sticking, tacking, welding, fusion welding, bonding or adhesion or any combination therof, and in the embodiment of the present invention comprising plastic particles even sintering, or in any other similar manner known to a person skilled in the art.

The inventive method is described below with reference to non-limiting, exemplifying embodiments thereof and also with reference to the accompanying drawings, throughout which like designation numbers refers to like objects, which illustrate various steps of non-limiting, exemplifying embodiments of the manufacturing process.

DETAILED DESCRIPTION OF THE INVENTION

Figure 1:
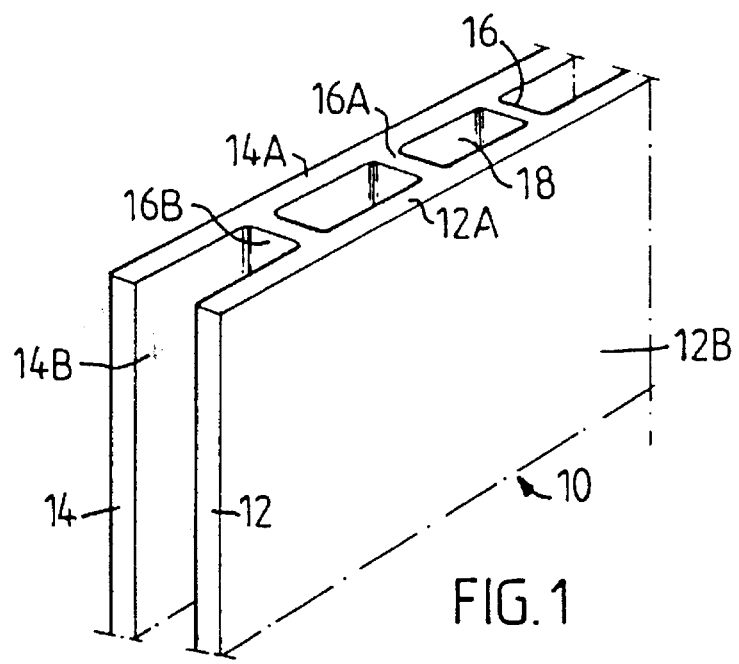
FIG. 1 is a schematic illustration of one corner part of a plastic channel plate.
Figure 2:
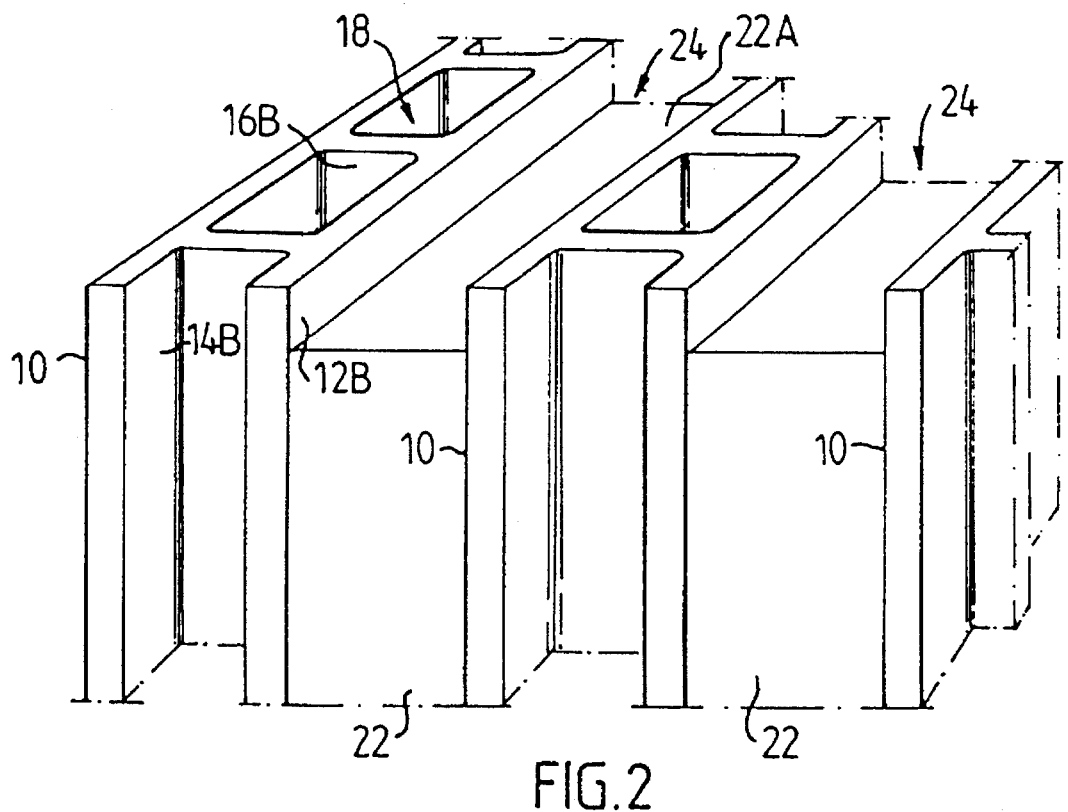
FIG. 2 illustrates schematically in perspective view one end of a channel-plate pack with intermediate spacer members, prior to the heat treatment.

The channel plates 10 may, for instance, be of the kind that are extruded from polypropylene, designated "Akylux" (supplied by Kayserberg Packaging SA, France) and has two mutually parallel outer walls 12, 14 which are interconnected by a plurality of mutually parallel intermediate walls 16 to form through flow channels 18. The thickness of the channel plates may vary from about 1.0 mm to about 50 mm.

The end edges of the outer walls are designated 12 A, 14 A while the end edges of the intermediate walls are designated 16 A.

The end-portions of the outer walls are designated 12 B, 14 B, while the end portions of the intermediate walls are designated 16 B.

Figure 3:
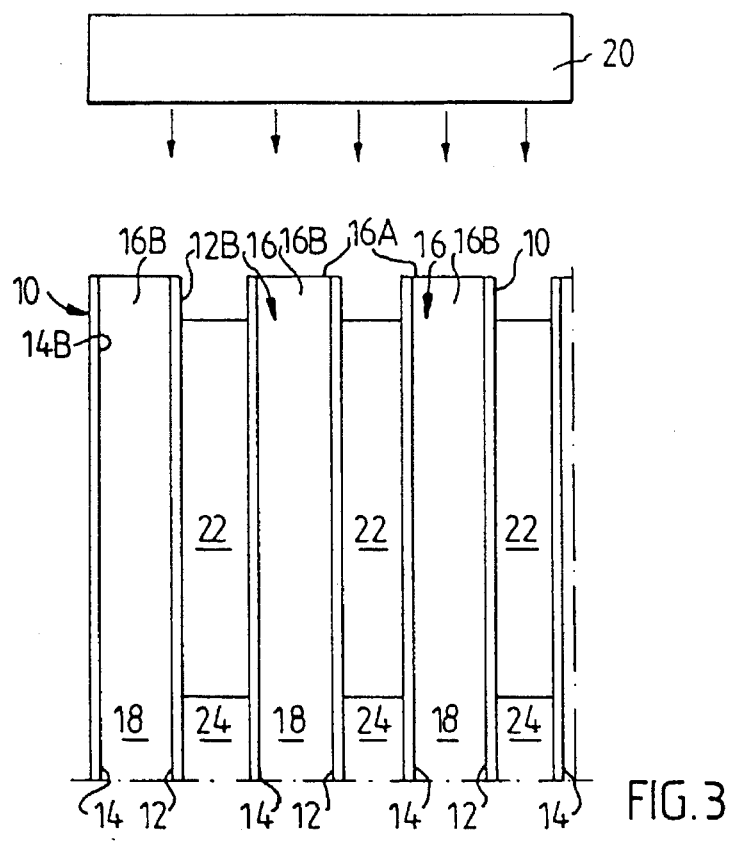
FIG. 3 illustrates the basic state of the pack shown in FIG. 2 prior to the heat treatment.

FIG. 3 illustrates the step of heating the end of the channel plate 10 with the aid of a device 20 which radiates heat or delivers thermal convection heat.

Figure 6:
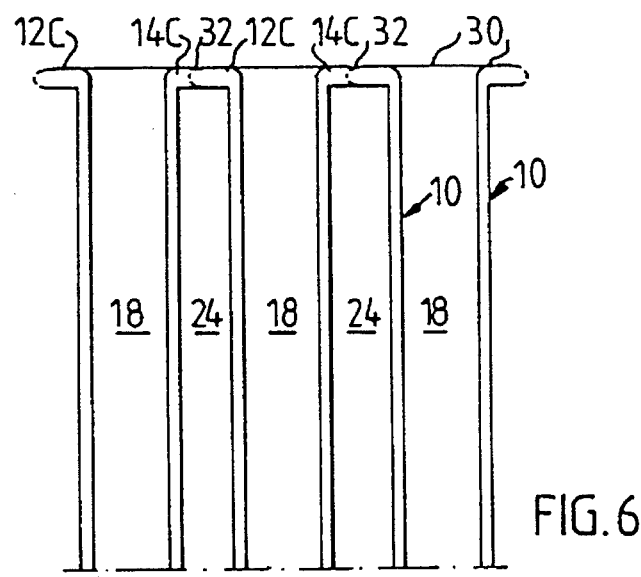
FIG. 6 illustrates the finished product, subsequent to having removed the spacer members.

Prior to this heat treatment, a number of channel plates 10 are stacked together with spacer members 22 to form channels 24 (FIG. 6), which are intended to extend perpendicular to the channels 18. FIG. 3 is an end view of the resultant pack, with the heating source 20 located adjacent said end. The heating source 20 and the pack are moved parallel in relation to one another, thereby making continuous manufacture possible.

Initial heating of the end-portions 16 B of the intermediate wall 16 in accordance with the FIG. 3 illustration, causes the end-portions 16 B to melt and to take a position 16 C, therewith exposing the end-portions 12 C, 14 C, which have softened to a plastic or semi-liquid state.

Figure 4:
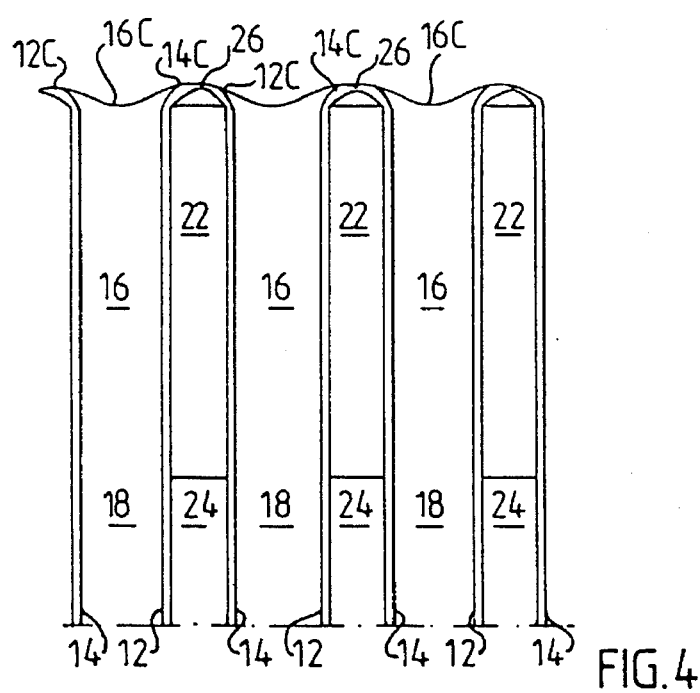
FIG. 4 is a view similar to that of FIG. 3 and shows the pack subsequent to melting of the end-portions of the intermediate walls and subsequent to outward bending of the end-portions of the outer walls caused by the heat treatment, and further shows the end-portions integated with outwardly curved or bent edges of adjacent end-portions.

When heating is continued, the end-portions 12 C, 14 C will bend outwards away from one another to the position illustrated in FIG. 4 and the edges of said plates will fuse together to form joins 26, this outward bending of the end-portions 12 C, 14 C being caused by the changes that the heat delivered to said end-portions engenders in the extrusion-induced stresses in the channel plates.

Figure 5:
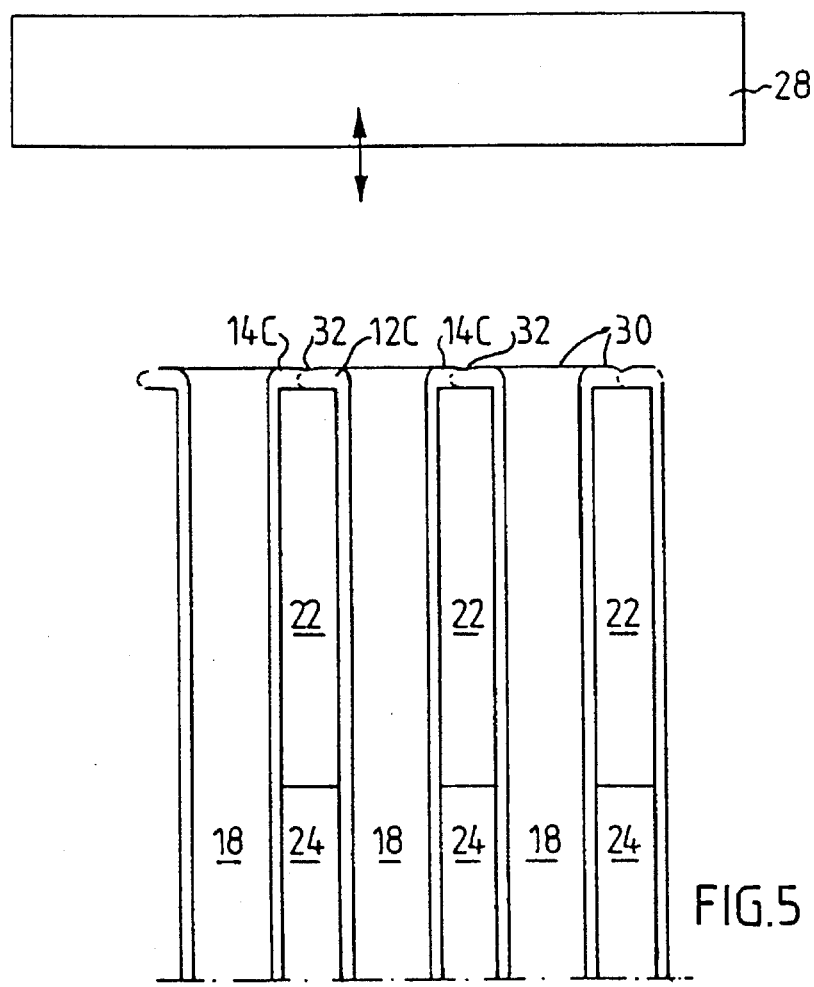
FIG. 5 shows the ends of respective outwardly bent end-portions flattened with the aid of a flattening plate or flattening roller.

FIG. 5 illustrates a pressure roller 28, which is caused to roll over the end surface of the pack in a manner to flatten the joins 26 of the outer walls, so that the outer surfaces thereof will lie along a flat end surface 30 and form joins 32. In this way the channels 24 are terminated by thickened and therewith relatively strong end walls. Flattening of the joins 26 also provides extremely good measurement accuracy between the end surfaces of the plate heat exchanger and also enhances the ability of the heat exchanger to absorb pressure forces.

Figure 7:
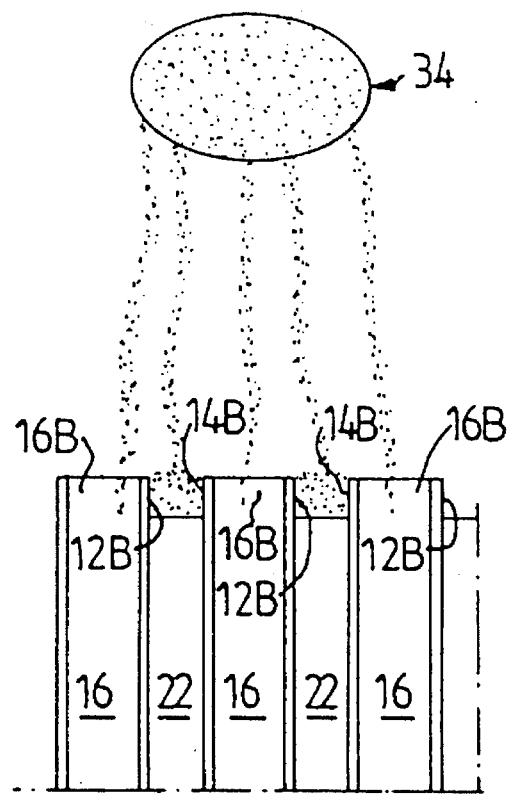
FIGS. 7 and 8 are views corresponding respectively to the views of FIGS. 3 and 4, but with the addition of plastic particles in some of the aforesaid interspaces.
Figure 8:
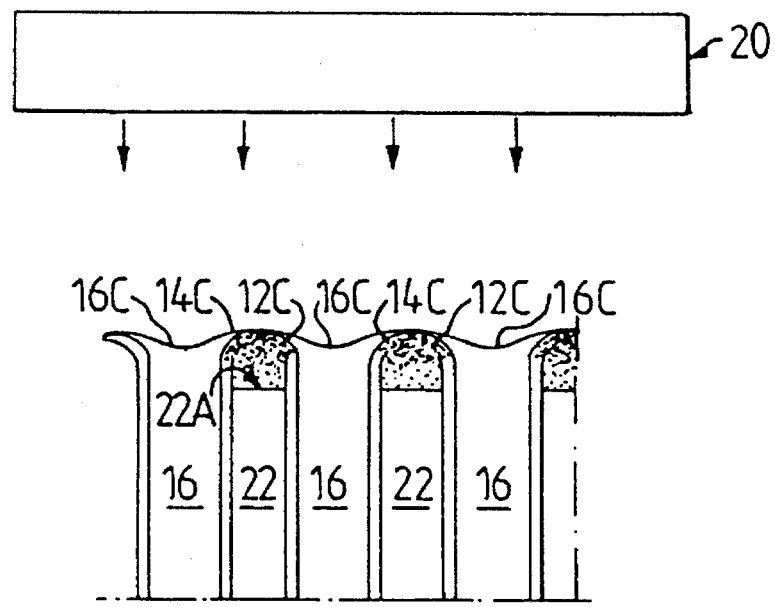

As mentioned above, the spaces defined by the channel-plate outer walls and the spacer members may be filled with plastic particles when carrying out the inventive method. This is illustrated in FIGS. 7 and 8. In FIG. 7 plastic particles are delivered from a plastic particle source 34 into the intermediate spaces defined by the end-portions of the outer walls 12 B, 14 B and the end edges 22 A of the spacer members. FIG. 8 illustrates a situation at some stage during the subsequent heat treatment when the particles and the outwardly bending end-portions of the outer walls 12 C, 14 C are forming an integrated unity; as illustrated, the joins can, as an alternative, consist of melted particles in combination with the outwardly bending end-portions, without any need for said outwardly bending end-portions to be in direct contact with each other.

We claim:

1. A method of manufacturing heat exchangers for counter flow, cross flow or parallel flow, which comprises: mutually stacking a plurality of extruded plastic channel plates together with heat-absorbing intermediate spacer members so as to form a first channel system between the channel plates and to form a second channel system consisting of channels in the channel plates, said plates having two outer walls which are mutually connected by parallel intermediate walls to form the second channel system, and wherein the end-edges of the outer walls forming respective channel walls in the first channel system are mutually joined with the aid of heat treatment so as to close the channels of the first channel system at the side edges of said channels, heating with one of radiation heat and thermal convection heat the end sides of the plate pack, in the proximity of the ends of the second channel system until a predetermined length of the end-portions of the intermediate walls has melted down and at the same time causing the end-portions of adjacent outer walls on a respective channel plate to bend outwardly away from one another as a result of changes, due to the heat treatment and the heat-absorbing intermediate spacer members, in the stresses present in the plastic material, bringing the essentially semi-liquid end-portions into contact with the outwardly bent end-portions of the outer walls of the adjacent channel plates and integrating said semi-liquid end-portions with said outer walls, and removing the intermediate spacer members.

2. A method according to claim 1, wherein the channel plates are made of a polypropylene plastic material.

3. A method according to claim 1, wherein the heat-absorbing intermediate spacer members are disposed in the vicinity of the endportions of the outer walls prior to said heat treatment.

4. A method according to claim 1, further including flattening the heat-treated end-portions while said portions are in a heated and plastic state, with a flattening pressure plate or pressure roller.

5. A method according to claim 1, wherein the intermediate spacer members have the form of aluminum strips or aluminum plates.

6. A heat exchanger produced by a method according to claim 1.

7. A method of manufacturing heat exchangers for counter flow, cross flow or parallel flow, which comprises: mutually stacking a plurality of extruded plastic channel plates together with heat-absorbing intermediate spacer members so as to form a first channel system between the channel plates and to form a second channel system consisting of channels in the channel plates, said plates having two outer walls which are mutually connected by parallel intermediate walls to form the second channel system, and wherein the end-edges of the outer walls forming respective channel walls in the first channel system are mutually joined with the aid of heat treatment so as to close the channels of the first channel system at the side edges of said channels, introducing from one of the end sides of the plate pack, where the ends of the second channel system are located, plastic particles into at least one of the spaces defined by the outer surfaces of the outer walls of two mutually adjacent channel plates and intermediate spacer members which are disposed in the proximity of the end-portions of the outer walls, heating said end side with one of radiation heat and thermal convection heat until a given length of the intermediate-wall end-portions has been brought to a given molten state, such that the end-portions of said adjacent outer walls on a respective channel plate are caused to bend away from one another as a result of heat-engendered changes in the stresses in the plastic material and the heat-absorbing intermediate spacer members, and the essentially semi-molten end-portions with the plastic particles introduced therebetween are formed to an integrated unity and essentially integrated with the outwardly bent end-portions of the outer walls of adjacent channel plates and with the plastic particles, and removing the intermediate spacer members.

8. A method according to claim 7, wherein the plastic particles are polypropylene particles.

9. A method according to claim 2, wherein the channel plates are made of a polypropylene plastic material.

10. A method according to claim 7, wherein the heat-absorbing intermediate spacer members are disposed in the vicinity of the endportions of the outer walls prior to said heat treatment.

11. A method according to claim 7, further including flattening the heat-treated end-portions while said portions are in a heated and plastic state, with a flattening pressure plate or pressure roller.

12. A method according to claim 7, wherein the heat-absorbing intermediate spacer members have the form of aluminum strips or aluminum plates.

13. A heat exchanger produced by a method according to claim 7.

* * * * *